United States Patent
Wang et al.

(10) Patent No.: US 11,582,478 B2
(45) Date of Patent: Feb. 14, 2023

(54) VIDEO ENCODING TECHNIQUE UTILIZING USER GUIDED INFORMATION IN CLOUD ENVIRONMENT

(71) Applicant: ALIBABA GROUP HOLDING LIMITED, Grand Cayman (KY)

(72) Inventors: Yuhao Wang, San Mateo, CA (US); Minghai Qin, San Mateo, CA (US); Jian Lou, San Mateo, CA (US); Yen-Kuang Chen, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/014,248

(22) Filed: Sep. 8, 2020

(65) Prior Publication Data

US 2022/0078473 A1 Mar. 10, 2022

(51) Int. Cl.
*H04N 19/52* (2014.01)
*H04N 19/162* (2014.01)
*H04N 19/159* (2014.01)
*H04N 19/167* (2014.01)
*A63F 13/358* (2014.01)

(52) U.S. Cl.
CPC ........... *H04N 19/52* (2014.11); *A63F 13/358* (2014.09); *H04N 19/159* (2014.11); *H04N 19/162* (2014.11); *H04N 19/167* (2014.11)

(58) Field of Classification Search
CPC .... H04N 19/52; H04N 19/159; H04N 19/162; H04N 19/167; A63F 13/358
See application file for complete search history.

(56) References Cited

U.S. PATENT DOCUMENTS

| | | | |
|---|---|---|---|
| 6,057,832 A * | 5/2000 | Lev | H04N 21/2387 725/100 |
| 9,367,931 B1 * | 6/2016 | Eilam | G06T 9/00 |
| 9,451,197 B1 * | 9/2016 | Krause | H04N 21/8153 |
| 2004/0131118 A1 * | 7/2004 | Kim | H04N 19/61 386/E5.052 |
| 2009/0034847 A1 * | 2/2009 | Hirohata | H04N 1/00843 382/190 |
| 2012/0207220 A1 * | 8/2012 | Kim | H04N 19/463 375/E7.193 |
| 2013/0010060 A1 * | 1/2013 | Lv | H04N 21/2381 348/51 |
| 2013/0155184 A1 * | 6/2013 | Chen | H04N 19/597 348/43 |
| 2014/0078343 A1 * | 3/2014 | Dai | H04N 5/23229 348/231.99 |
| 2014/0123177 A1 * | 5/2014 | Kim | H04N 21/47202 725/61 |
| 2018/0028273 A1 * | 2/2018 | Yokosawa | G01R 33/50 |
| 2018/0146198 A1 * | 5/2018 | Atluru | G06V 20/41 |
| 2020/0289937 A1 * | 9/2020 | Osman | A63F 13/355 |

* cited by examiner

*Primary Examiner* — Zaihan Jiang
(74) *Attorney, Agent, or Firm* — Finnegan, Henderson, Farabow, Garrett & Dunner, LLP

(57) ABSTRACT

The present disclosure relates to a computer-implemented method for processing video data. The method comprises receiving a user input corresponding to a first picture of the video data, generating, based on the user input, prediction information of the first picture with respect a reference picture of the video data, and encoding the first picture using the prediction information.

20 Claims, 12 Drawing Sheets

VIDEO ENCODING TECHNIQUE UTILIZING USER GUIDED INFORMATION IN CLOUD ENVIRONMENT

BACKGROUND

The video game industry, particularly, online video game industry has rapidly grown in recent years. As the current technology can support transmission of a large volume of data over a network in real time, e.g., video streaming service, network capacity is no longer a critical bottleneck in providing online game service in a cloud platform. Rather, encoding (e.g., compressing) processes to video content may be mainly responsible for latency in playing online video games. Therefore, efficient encoding of video data is important in providing online game service in a cloud platform.

SUMMARY OF THE DISCLOSURE

Embodiments of the present disclosure provide a computer-implemented method for processing video data. The method comprises receiving a user input corresponding to a first picture of the video data, generating, based on the user input, prediction information of the first picture with respect a reference picture of the video data, and encoding the first picture using the prediction information.

Embodiments of the present disclosure provide an apparatus for processing video data. The apparatus comprises a memory for storing a set of instructions; and at least one processor configured to execute the set of instructions to cause the apparatus to perform: receiving a user input corresponding to a first picture of the video data, generating, based on the user input, prediction information of the first picture with respect a reference picture of the video data, and encoding the first picture using the prediction information.

Embodiments of the present disclosure also provide a non-transitory computer readable medium that stores a set of instructions that is executable by at least one processor of a computing device to perform a method for processing video data. The method comprises receiving a user input corresponding to a first picture of the video data, generating, based on the user input, prediction information of the first picture with respect a reference picture of the video data, and encoding the first picture using the prediction information.

Embodiments of the present disclosure also provide a system comprising a user device including a displayer and a user input provider and an apparatus for processing video data. The apparatus comprises a memory for storing a set of instructions; and at least one processor configured to execute the set of instructions to cause the apparatus to perform: receiving, from the user device, a user input corresponding to a first picture of the video data, generating, based on the user input, prediction information of the first picture with respect a reference picture of the video data, and encoding the first picture using the prediction information.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

Embodiments and various aspects of present disclosure are illustrated in the following detailed description and the accompanying figures. Various features shown in the figures are not drawn to scale.

DETAILED DESCRIPTION

Figure 1:
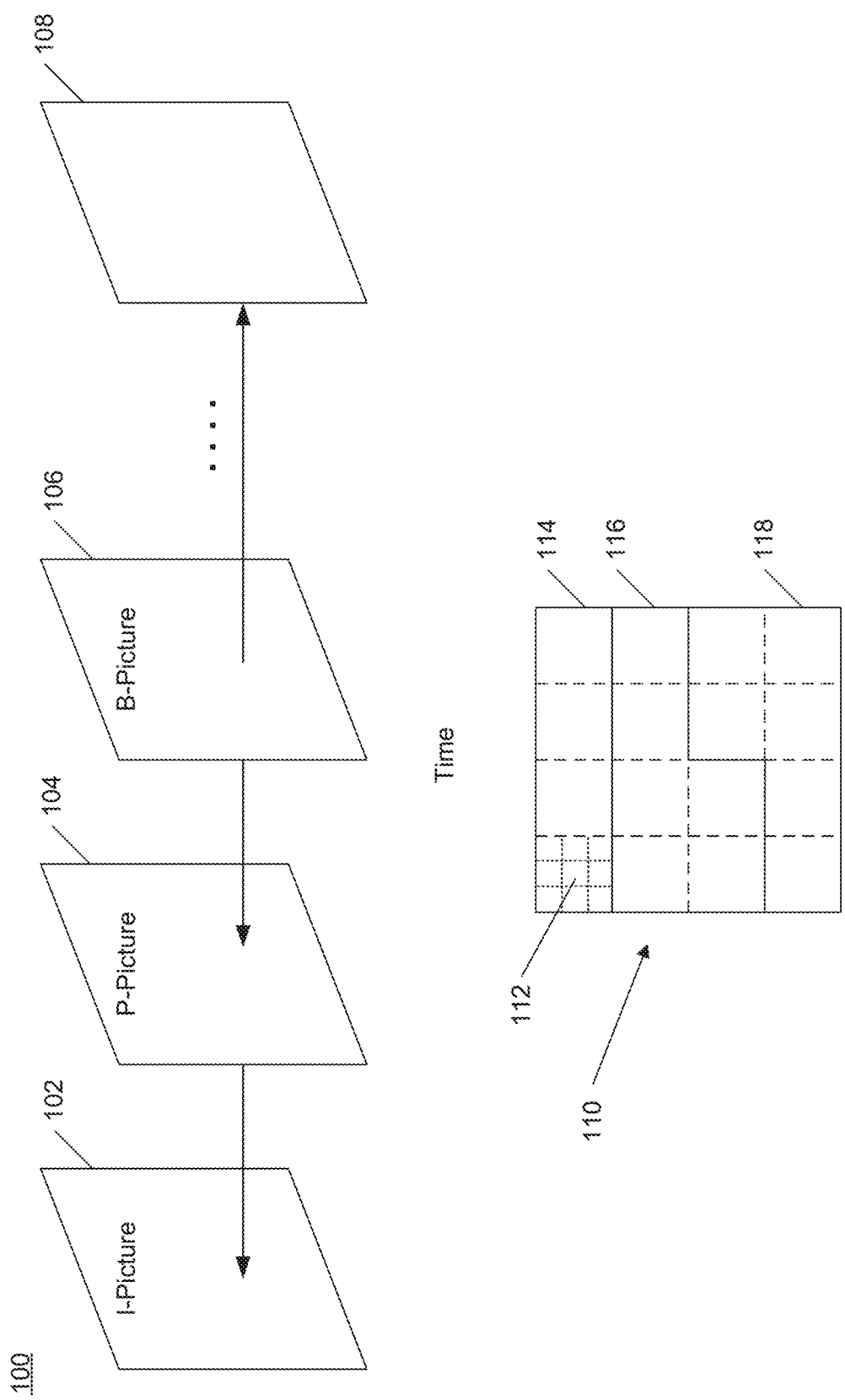
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Video gaming is very sensitive to latency of a control-feedback loop. For some video games, latency can be a critical factor that can make or break those games. As the current technology can support transmission of a large volume of data over a network in real time, e.g., video streaming service, network capacity is no longer a critical bottleneck in providing online gaming service in a cloud platform. Rather, an encoding (e.g., compressing) process to video content may be mainly responsible for latency in playing online video games. Therefore, efficient encoding of video data is important to provide responsive and satisfactory user experiences when playing online video games.

Motion estimation usually occupies 60 to 80% of encoding time or computing resources. Therefore, reducing motion estimation complexity can greatly improve video encoding efficiency and online game quality. Some embodiments of the present disclosure can provide a system and method to utilize user inputs to improve video encoding latency, visual quality, or encoding throughput. According to some embodiments of the present disclosure, video encoding speed or bandwidth utilization can be improved by performing region of interest encoding based on user guided information. According to some embodiments of the present disclosure, motion estimation complexity can be greatly reduced by using user guided information when encoding P-pictures. According to some embodiments of the present disclosure, an efficient video encoding scheme predicting motion vectors based on user guided information can be provided.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

In order to achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recently and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture (intra coded picture)." A picture coded using a previous picture as a reference picture is referred to as a "P-picture (predicted picture)." A picture coded using both a previous picture and a future picture as reference pictures (i.e., the reference is "bi-directional") is referred to as a "B-picture (bi-directional predicted picture)."

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
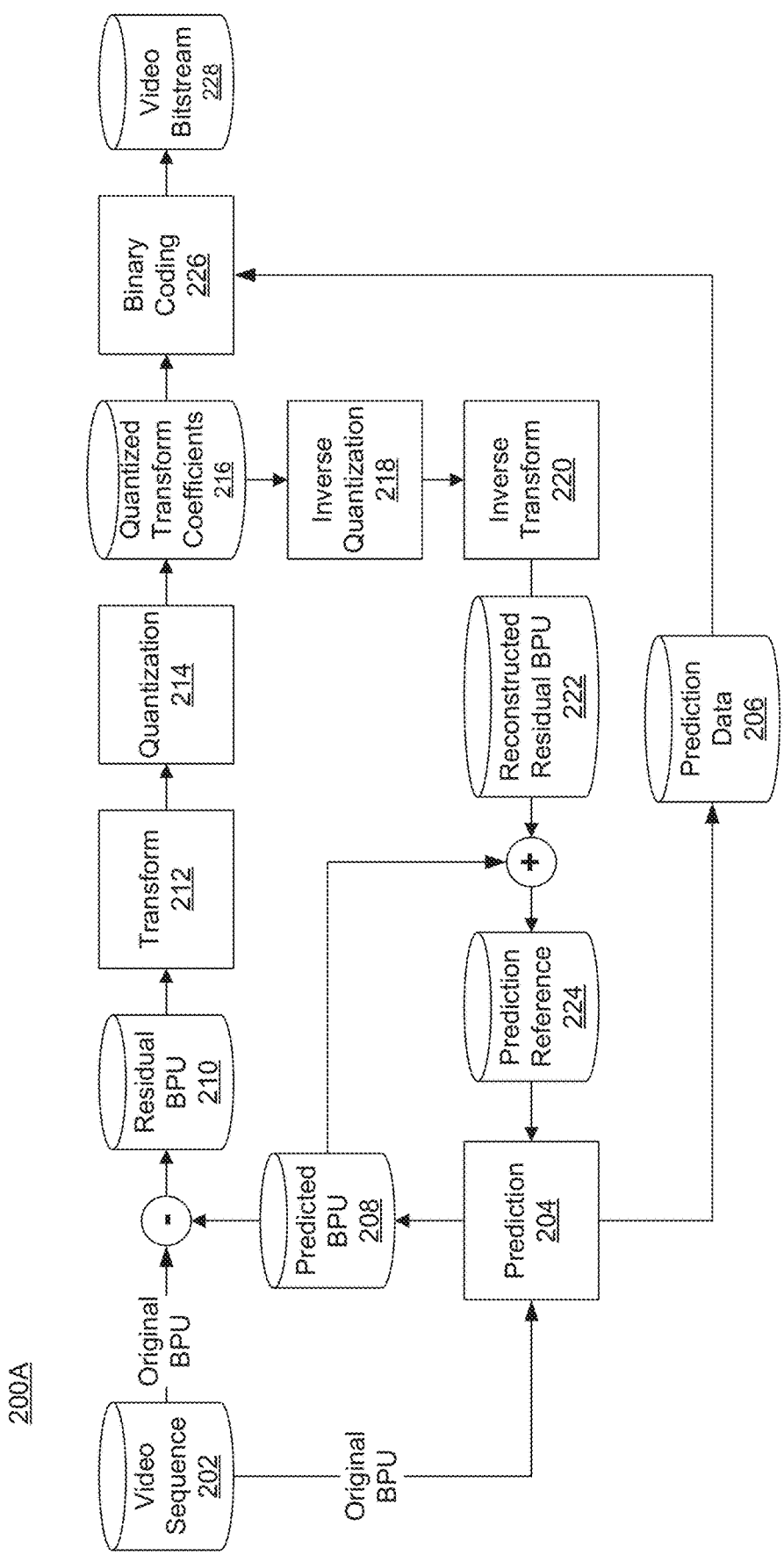
FIG. 2A illustrates a schematic diagram of an example encoding process of a hybrid video coding system, consistent with embodiments of the disclosure.
Figure 2B:
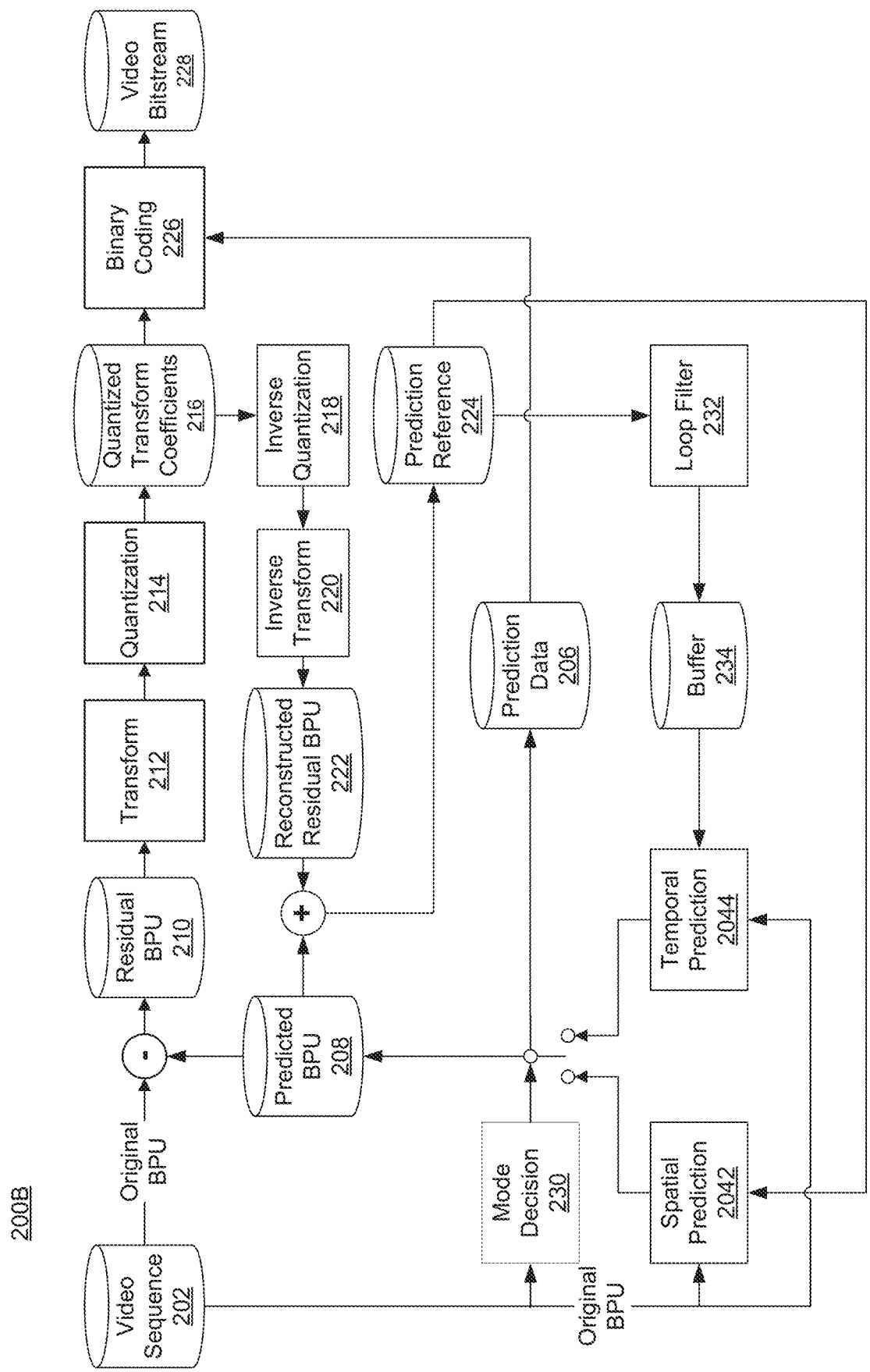
FIG. 2B illustrates a schematic diagram of another example encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction stage 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
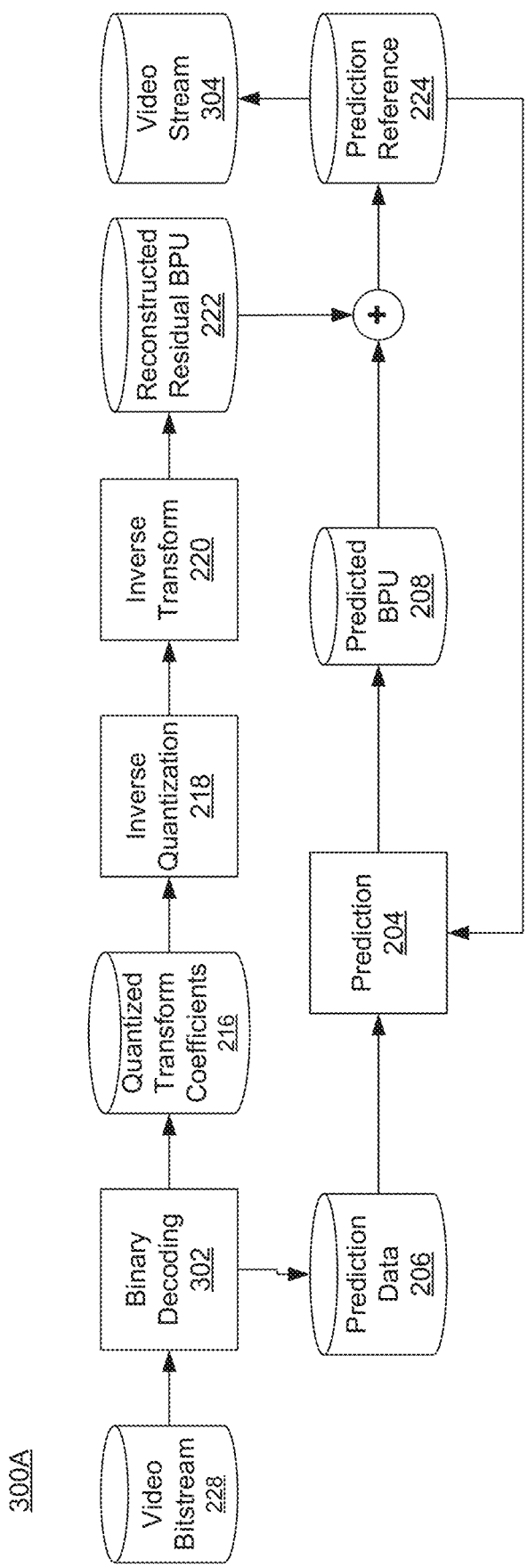
FIG. 3A illustrates a schematic diagram of an example decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
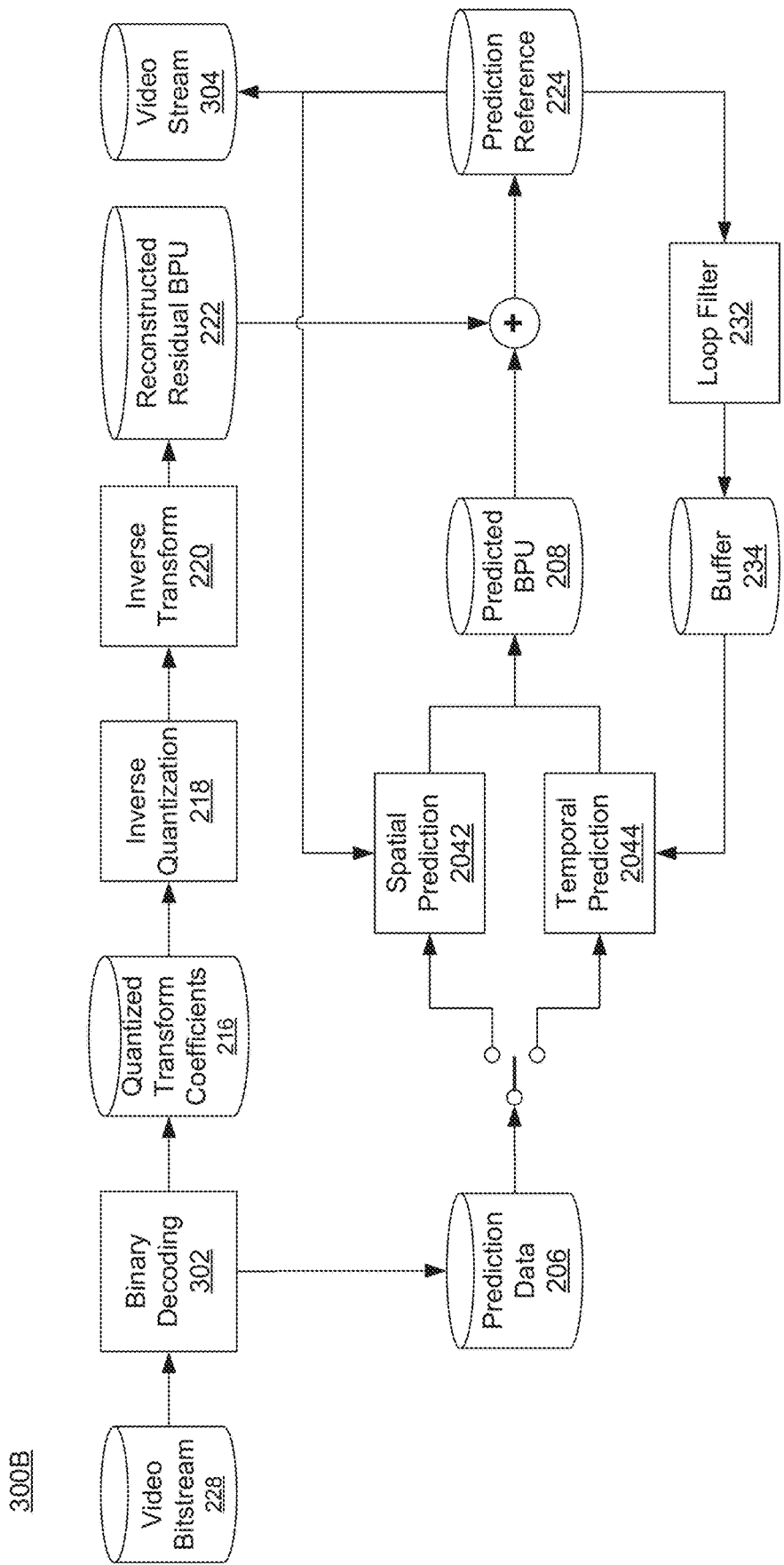
FIG. 3B illustrates a schematic diagram of another example decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4A:
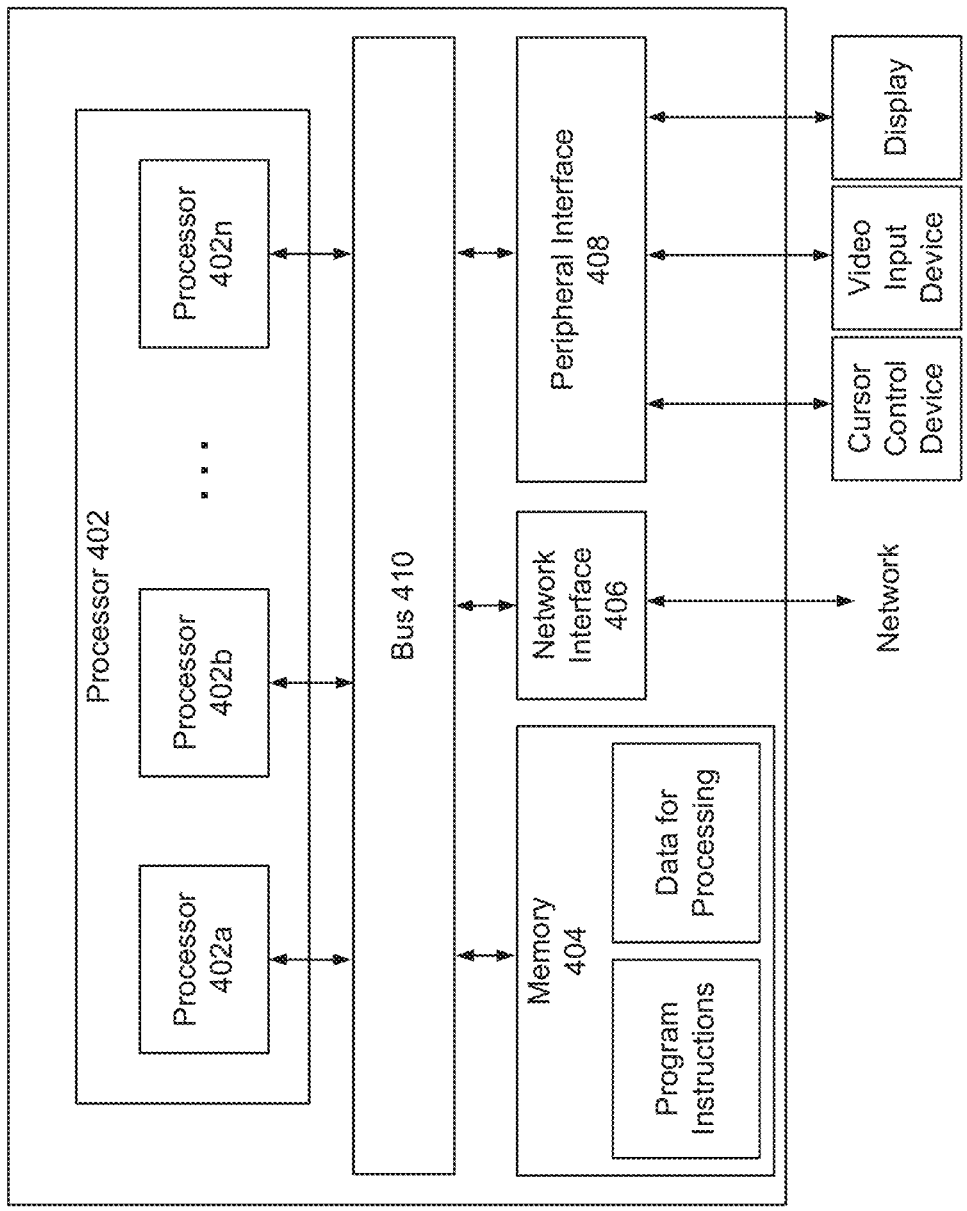
FIG. 4A is a block diagram of an example apparatus for encoding or decoding a video, consistent with some embodiments of the present disclosure.

FIG. 4A is a block diagram of an example apparatus 400 for encoding or decoding a video, consistent with embodiments of the disclosure. As shown in FIG. 4A, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4A, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4A, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4A) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure.

The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4A, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface communicatively coupled to a video archive), or the like. While FIG. 4A is illustrated to include peripheral interface 408, it will be appreciated that apparatus 400 can communicate with one or more peripheral devices over a network, e.g., via network interface 406.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

In the quantization and inverse quantization functional blocks (e.g., quantization 214 and inverse quantization 218 of FIG. 2A or FIG. 2B, inverse quantization 218 of FIG. 3A or FIG. 3B), a quantization parameter (QP) is used to determine the amount of quantization (and inverse quantization) applied to the prediction residuals. Initial QP values used for coding of a picture or slice can be signaled at the high level, for example, using init_qp_minus26 syntax element in the Picture Parameter Set (PPS) and using slice_qp_delta syntax element in the slice header. Further, the QP values can be adapted at the local level for each CU using delta QP values sent at the granularity of quantization groups.

Figure 4B:
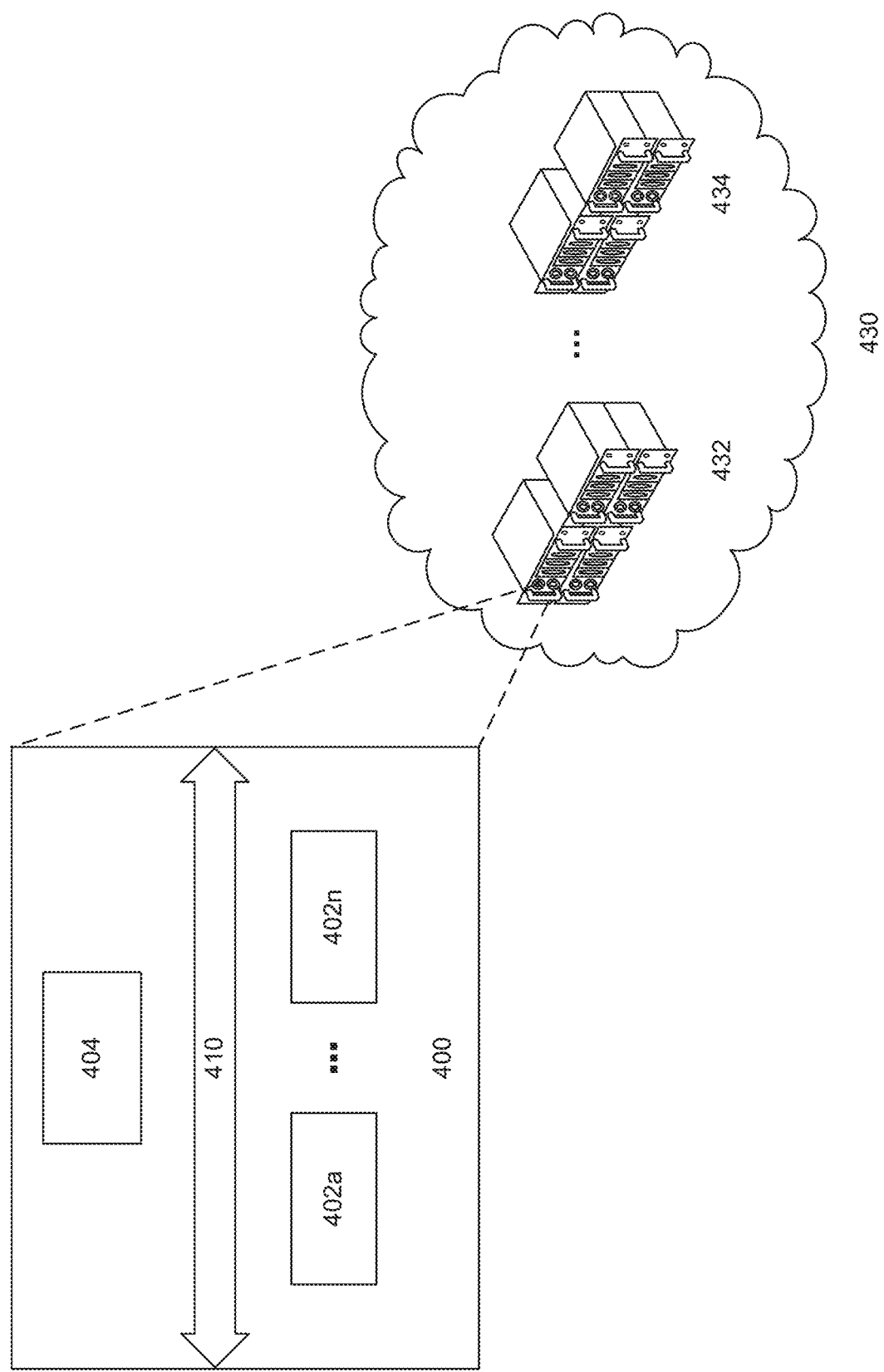
FIG. 4B illustrates a schematic diagram of an exemplary cloud system incorporating an apparatus for encoding or decoding a video, consistent with some embodiments of the present disclosure.

FIG. 4B illustrates a schematic diagram of an exemplary cloud system 430 incorporating apparatus 400, consistent with some embodiments of the present disclosure. As shown in FIG. 4B, cloud system 430 (e.g., Ali Cloud) can provide cloud service with artificial intelligence (AI) capabilities, and can include a plurality of computing servers (e.g., 432 and 434). The plurality of computing servers can be grouped physically or virtually in one or more networks that together form cloud system 430. The one or more networks can be private, public, community, or a combination thereof. In some embodiments, a computing server 432 can include, for example, apparatus 400 of FIG. 4A. Apparatus 400 is shown in FIG. 4B in a simplified manner for simplicity and clarity.

Figure 5:
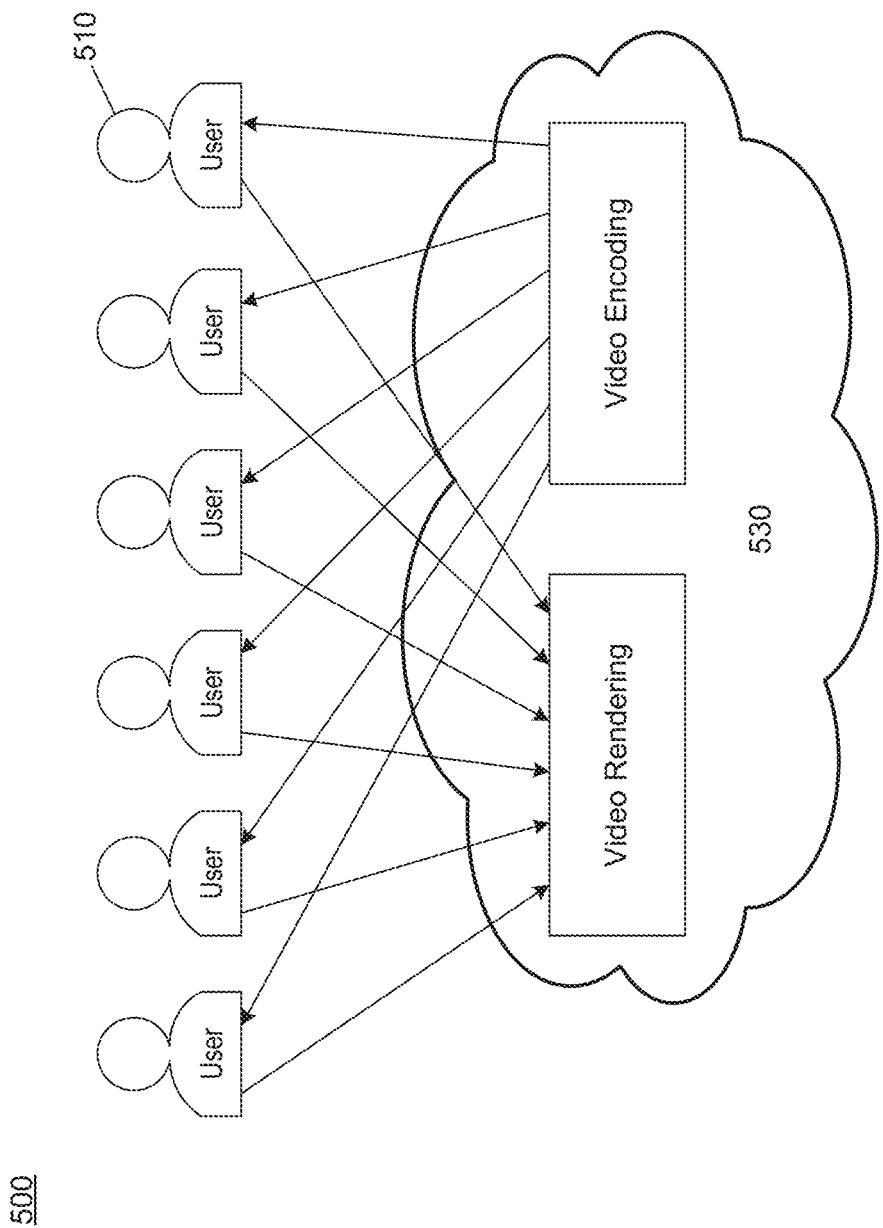
FIG. 5 illustrates a schematic diagram of an exemplary cloud system for online video game service, consistent with some embodiments of the present disclosure.

FIG. 5 illustrates a schematic diagram of an exemplary cloud system for online video game service, consistent with some embodiments of the present disclosure. As shown in FIG. 5, cloud service system 500 for providing online video game service can include multiple users 510 and cloud system 430 of FIG. 4B that is responsible for video rendering and video encoding. In some embodiments, multiple users 510 may play the same game as or different games from each other. As shown in FIG. 5, users 510 can watch video content displayed on a screen and send user inputs or feedbacks via user devices. Based on the user inputs or feedbacks, cloud system 430 can perform video rendering and encoding, and the encoded video is transmitted to users 510 over a network. Unlike other streaming services that provide predetermined contents such as movies or dramas, online game service demands constant real-time video encoding in order for users 510 to have satisfactory experience in playing online games without delay or latency. Moreover, because each of users 510 provides different user inputs or feedbacks when playing online games, even when multiple users 510 play the same game as each other, video rendering and encoding is individually performed for each user. Accordingly, encoding video data in real time for each user can put heavy burden on a cloud system side in providing online game service, which usually causes latency in playing online games. On the other hand, on a user side, a user device may only decode video data it receives from cloud system 430 and thus it is less of an issue.

Figure 6:
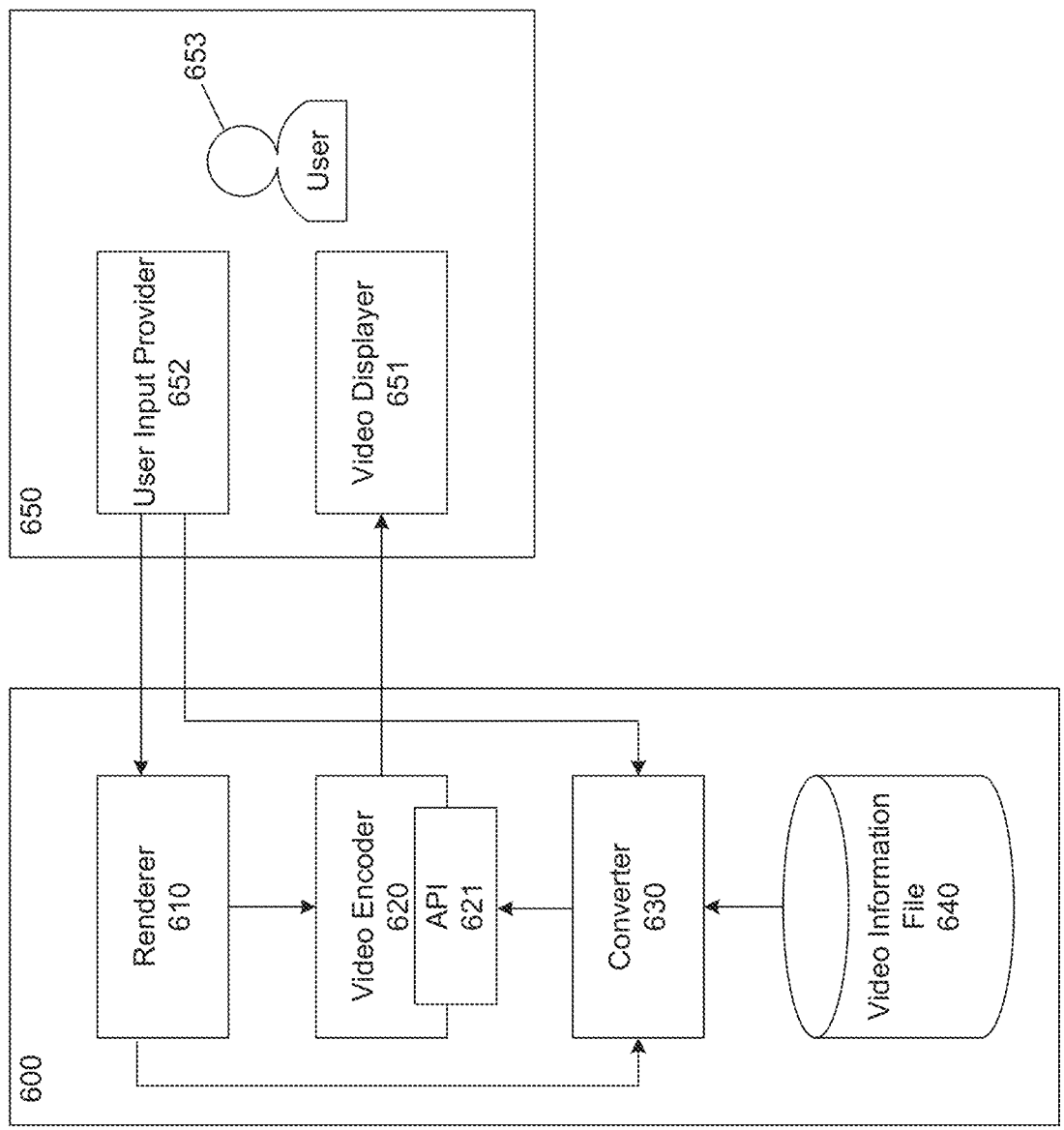
FIG. 6 illustrates a schematic diagram of an exemplary video encoding apparatus for providing online video game service, consistent with some embodiments of the present disclosure.

FIG. 6 illustrates a schematic diagram of an exemplary video encoding apparatus for providing online video game service, consistent with some embodiments of the present disclosure. As shown in FIG. 6, video encoding apparatus 600 can comprise renderer 610, video encoder 620, and converter 630. According to some embodiments of the present disclosure, video encoding apparatus 600 can be configured to operate in two modes: a first operation mode where user guided prediction information from converter 630 is not utilized for video encoding in video encoder 620; and a second operation mode where user guided prediction information from converter 630 is utilized for video encoding in video encoder 620. In some embodiments, the second operation mode can be triggered when user inputs are received or P-pictures are encoded. In some embodiments, the first operation mode and the second operation mode can be selected by a default setting, a user setting, or implementation requirements, etc. It is appreciated that in various embodiments video encoding apparatus 600 may be part of apparatus 400 of FIG. 4A. In some embodiments, at least part of video encoding apparatus 600 may be part of apparatus 400 of FIG. 4A.

As illustrated in FIG. 6, video encoding apparatus 600 may communicate with user device 650 via, e.g., a network interface (e.g., network interface 406 in FIG. 4A), consistent with some embodiments of the present disclosure. In some embodiments, user device 650 may comprise video displayer 651 (e.g., a cathode-ray tube display, a liquid crystal display, or a light-emitting diode display) for displaying a video. In some embodiments, video displayer 651 can receive and decompress encoded video data from video encoding apparatus 600 and can display the decompressed video data on its screen (not shown).

In some embodiments, user device 650 can comprise or communicate with user input provider 652 that includes, but is not limited to, a cursor control device (e.g., a mouse, a touchpad, or a touchscreen), a touch control device (e.g., touchscreen, touchpad, etc.), a keyboard, a video input device (e.g., a camera or an input interface coupled to a video archive), a microphone, joystick, a game controller, a game dedicated controller, or the like. In some embodiments, user 653 can control a video game displayed on video displayer 651 by providing control actions, user inputs, or feedbacks via user device 650. In the present disclosure, control actions, user inputs, and feedbacks are collectively referred to as user inputs.

Renderer 610 can perform picture rendering based on user inputs received from user input provider 652, consistent with embodiments of the present disclosure. Some embodiments of the present disclosure will be explained referring to FIG. 7A and FIG. 7B that illustrate example two consecutive pictures rendered by renderer 610, consistent with some embodiments of the present disclosure. In this example, first picture 700_1 of FIG. 7A can be a picture before a certain user input is received and second picture 700_2 of FIG. 7B can be a picture after the certain user input is received.

Referring back to FIG. 6, in some embodiments, renderer 610 can be configured to render a picture based on a scene file containing geometry, viewpoint, texture, lighting, and shading information describing a certain scene. In some embodiments, a scene file for corresponding video content can be stored in memory (e.g., memory 404 of FIG. 4A). In some embodiments, renderer 610 can be implemented by a game engine and a game engine can access or comprise a scene file describing scenes for implementing a certain video game. In some embodiments, renderer 610 can render first picture 700_1 of FIG. 7A based on a scene file corresponding to first picture 700_1.

In some embodiments, renderer 610 can further be configured to render a picture based on user inputs. In some embodiments, video content can be responsive to user inputs. When playing a video game, a scene at a certain time can be different depending on user inputs. For example, after first picture 700_1 is displayed on video displayer 651, user 653 may make a user input and a subsequent scene can be determined according to the user input. In this example, a user input corresponding to ball kicking is received after first picture 700_1 and thereby second picture 700_2 can be determined based on the user input.

In some embodiments, renderer 610 can render pictures based on user inputs and calculation of physics related to user inputs. In some embodiments, in order to determine a scene at a certain time, renderer 610 can determine how a target object corresponding to a user input moves between a previous picture and a subsequent picture. For example, renderer 610 can determine how far or in which direction ball 730 has moved from first picture 700_1 to second picture 700_2. In some embodiments, renderer 610 can determine a distance and a direction of motion of a target object. Based on determination of motion of a target object between two consecutive pictures, renderer 610 can determine where to put a target object in a subsequent picture. In some embodiments, renderer 610 can determine a motion speed and direction based on user inputs received from user input provider 652 and a motion distance can be calculated based on the determined motion speed. For example, renderer 610 can determine a speed of ball 730 according to press strength of a button on a keyboard when a press of the button corresponds to a user input of kicking a ball as an example. Renderer 610 can determine a direction of ball 730 according to a timing of press, a posture of first player 710, etc. In some embodiments, default values that have been set by a game provider or user 653 can be used as a motion speed and a direction corresponding to a certain user input. In some embodiments, renderer 610 can determine a position of a target object based on the determined speed and direction of the target object in response to a user input. While one target object (e.g., ball 730) is explained as being affected by one user input, it is appreciated that any number of target objects can be affected by one or more user inputs in some embodiments of the present disclosure.

As shown in FIG. 6, video encoder 620 can encode the rendered picture by renderer 610, consistent with some embodiments of the present disclosure. It is appreciated that in various embodiments video encoder 620 may perform at least part of stages in processes 200A or 200B of FIG. 2A and FIG. 2B. As discussed above, according to some embodiments of the present disclosure, video encoder 620 can be configured to operate in two modes: a first operation mode where user guided prediction information from converter 630 is not utilized for video encoding in video encoder 620; and a second operation mode where user guided prediction information from converter 630 is utilized for video encoding in video encoder 620. According to some embodiments of the present disclosure, video encoder 620 can encode I-picture based on the rendered picture without predicting or estimating changes referring to other pictures. For example, first picture 700_1 of FIG. 7A can be encoded as I-picture. In some embodiments, video encoder 620 can operate in the first operation mode when encoding I-pictures. According to some embodiments of the present disclosure, video encoder 620 can encode P-picture based on the rendered video picture including changes with respect to a reference picture. For example, second picture 700_2 of FIG. 7B can be encoded as P-picture using first picture 700_1 as a reference picture. In some embodiments, P-picture corresponding to second picture 700_2 can include changes such as position changes, luminosity changes, color changes of pixels, and so on with respect to I-picture. In some embodiments, video encoder 620 can operate in either of the first operation mode or the second operation mode when encoding P-pictures. For example, video encoder 620 can operate in the second operation mode in encoding P-pictures when there are user inputs. Video encoder 620 can operate in the first operation mode in encoding P-pictures when there are no user inputs. In some embodiments, video encoder 620 can receive user guided information from converter 630 via application program interface (API) 621, which will be explained in detail. In some embodiments, video encoder 620 may not estimate or predict at least part of motion vectors that represent motion changes of a current picture (e.g., P-picture) from a reference picture (e.g., I-picture). In some embodiments, video encoder 620 may utilize user guided information to perform region of interest (ROI) encoding, which can improve video encoding speed, bandwidth utilization, or video encoding throughput.

According to some embodiments, upon receiving user inputs, a second operation mode can be initiated and converter 630 can start operating. Converter 630 can generate, from user inputs, prediction information that video encoder 620 can use when encoding P-pictures, consistent with some embodiments of the present disclosure. In some embodiments, prediction information can comprise motion information, region information, etc. In some embodiments of the present disclosure, converter 630 can receive user inputs from user input provider 652 and can estimate motion information based on the received user inputs. In some embodiments, motion information can comprise distance and direction information of motion of a target object between a reference picture and a current picture. In some embodiments, motion information can be represented as motion vectors that represent position changes of a group of pixels that represent a target object. In some embodiments, user inputs received from input provider 652 can be game control actions that the user takes via input provider 652.

According to some embodiments of the present disclosure, converter 630 can determine a meaning of user inputs. In some embodiments, user inputs may have different meanings depending on video contents. In some embodiments, converter 630 can refer to video information file 640 as shown in FIG. 6. In some embodiments, video information file 640 can contain information of a launched game, a game type, a user profile, etc. In some embodiments, a game type can include whether the game is a single player game (e.g., first-person shooter (FPS) game) or a multiplayer game (e.g., multiplayer online battle arena (MOBA) game). In some embodiments, a user profile can include information about which object or player is associated with a corresponding user. In some embodiments, video information file 640 can be any means of storing information, such as a file, a set of files, a database, a set of databases, et. In some embodiments, video information file 640 can be stored in memory (e.g., memory 404 of FIG. 4A).

In some embodiments, converter 630 can determine a meaning of user inputs based on association of user inputs with predetermined control actions in corresponding video content. In some embodiments, a single control action can have different meanings in different video content. For example, a press of a button on a keyboard (e.g., user input provider 652) can mean a ball kicking action in a soccer game while the same user input can mean a gun shooting action in a shooter game. In some embodiments, a single control action can have different effects on a picture according to a game type and a user profile. In some embodiments, based on game type information and user profile information, converter 630 can determine which object or player is controlled by a user. For example, when a launched game is a single player game, converter 630 can determine that a user input is directed to the single player on the game or an object associated with the single player. Similarly, when a launched game is a multiplayer game, converter 630 can determine which player or object is controlled by a user based on game type information and user profile information.

Figure 7A:
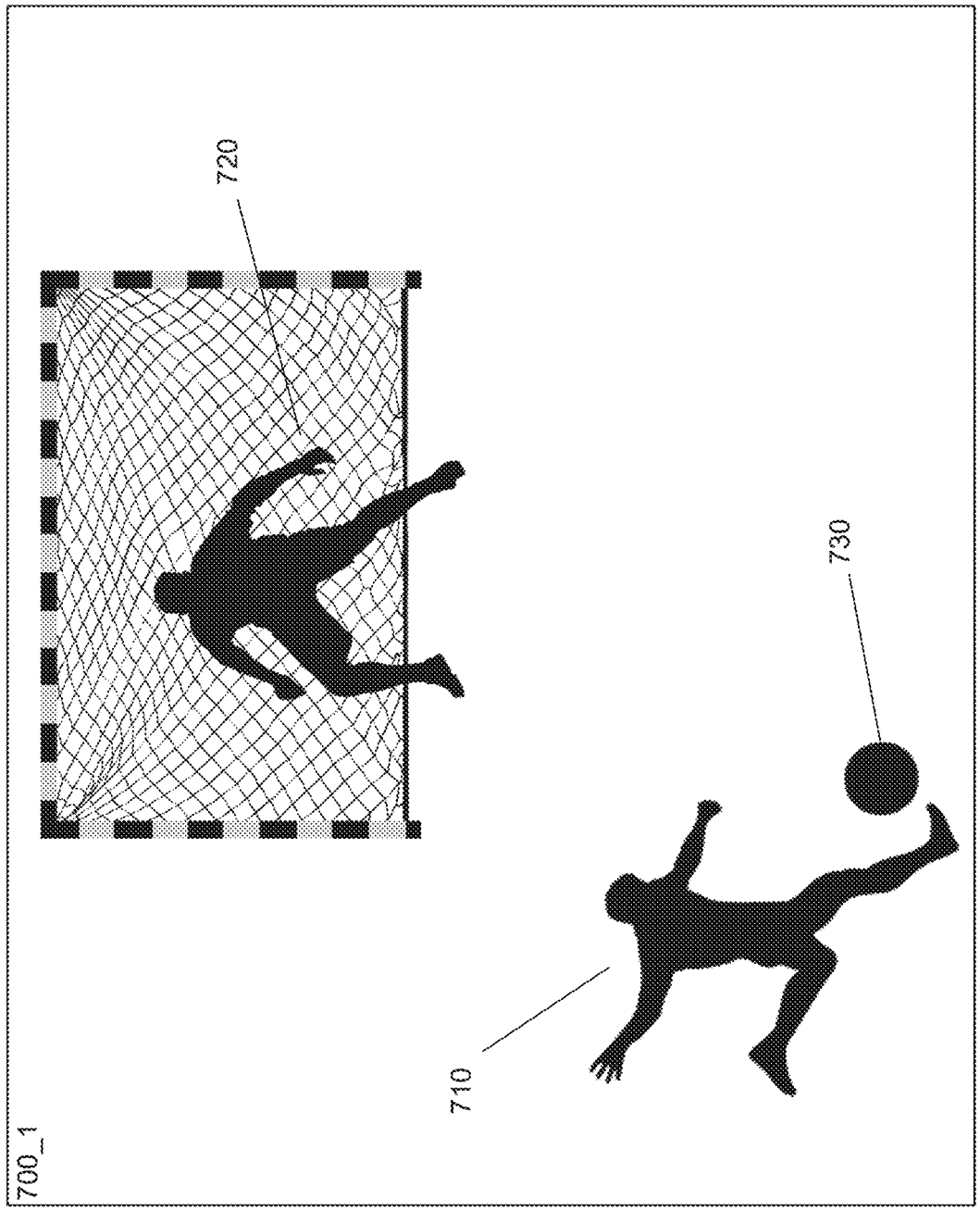
FIG. 7A illustrates an example first picture of video content, consistent with some embodiments of the present disclosure.
Figure 7B:
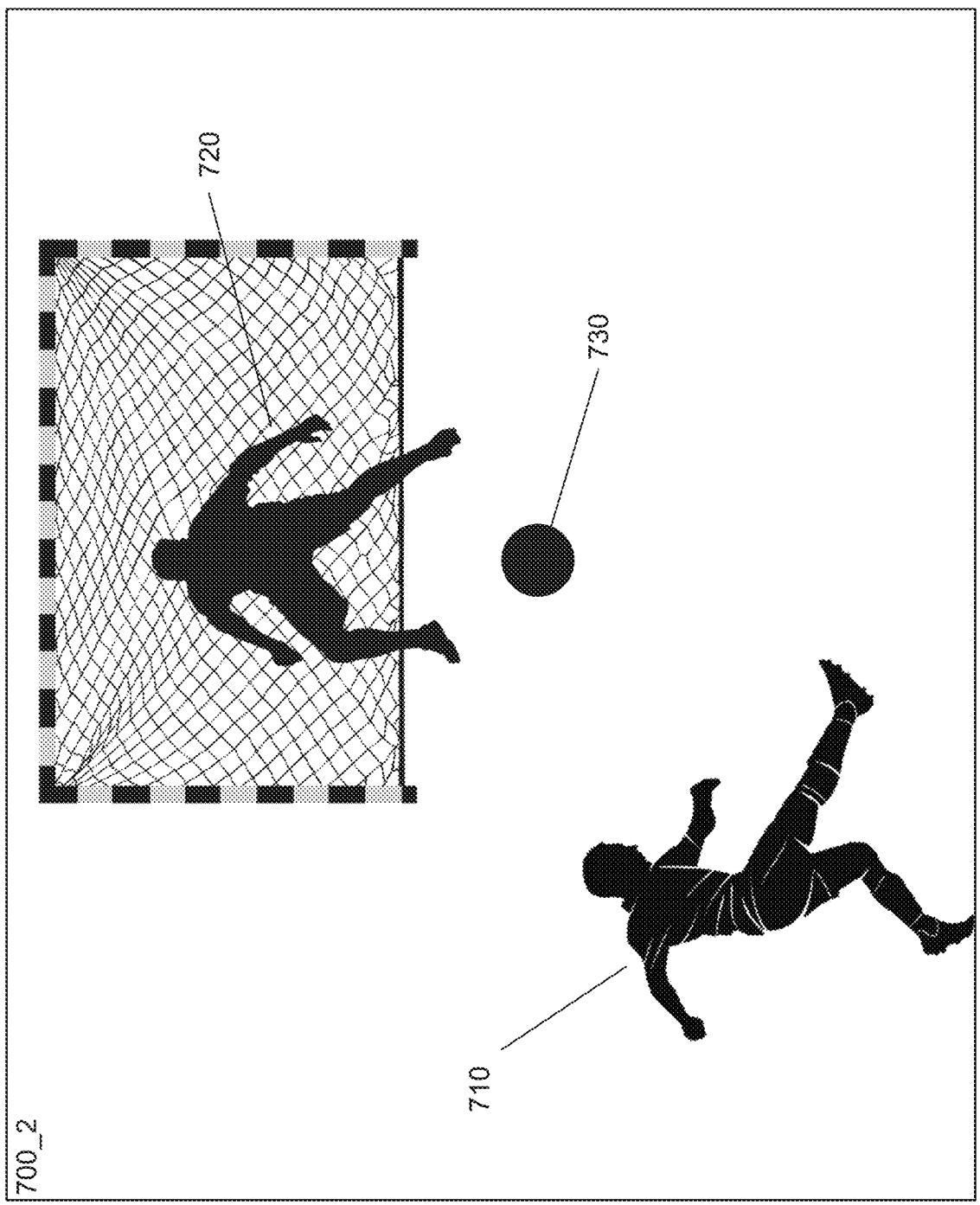
FIG. 7B illustrates an example second picture of video content, consistent with some embodiments of the present disclosure.

In the above example using first picture 700_1 and second picture 700_2 of FIG. 7A and FIG. 7B, converter 630 can receive a press of a button as a user input from user input provider 652 after first picture 700_1 is displayed on video displayer 651. Converter 630 can receive, from video information file 640, information that a launched game is a soccer game. By associating a user input (e.g., a press of a button) and a launched game, converter 630 can determine that the user input (e.g., a press of a space bar) is to kick a ball in the game. Converter 630 can further receive, from video information file 640, information that a launched game is a multiplayer game (e.g., first player 710 and second player 720) and a user is associated with first player 710. Converter 630 can determine that the kicking action by a press of a button is associated with first player 710. Thereby, converter 630 can determine that ball 730 associated with first player 710 will be affected by a press of a button. As shown in FIG. 7A and FIG. 7B, ball 730 is moved in second picture 700_2 compared to first picture 700_1.

Referring back to FIG. 6, converter 630 can further receive motion distance and direction information from renderer 610, consistent with some embodiments of the present disclosure. As illustrated above, converter 630 can receive a distance and a direction of motion of a target object corresponding to a received user input from renderer 610. In some embodiments, converter 630 can determine how far and in which direction a target object has moved in a current picture with respect to a reference picture. In the above example, converter 630 can determine how far ball 730 has moved from first picture 700_1 and in which direction ball 730 has moved from first picture 700_1 based on motion distance and direction information from renderer 610. As discussed above, in some embodiments of the present disclosure, converter 630 can determine motion vectors between two consecutive pictures based on received information from user input provider 652, video information file 640, or renderer 610.

According to some embodiments of the present disclosure, prediction information generated from user inputs by converter 630 may comprise region information that is predicted to comprise changes of a certain picture with respect to a reference picture. In some embodiments, converter 630 may generate region information that defines a region of interest (ROI) for encoding based on user inputs. In some embodiments, converter 630 may determine that a region including a target object of a user input comprises more important changes of a current picture with respect to a reference picture compared to other regions. For example, converter 630 may determine that a region including ball 730 (e.g., as a target object) associated with first player 710 comprises more important changes than a region associated with second player 720 in FIG. 7A and FIG. 7B. In some embodiments, converter 630 may determine that a region on which a cursor is placed may comprise important changes. In some embodiments, region information can be generated based on a meaning of user inputs that are determined referring to a game type or a user profile by converter 630 as discussed above. For example, when a game is a soccer game, converter 630 can determine that changes in a stand area may be less important and changes in a player ground is important. According to some embodiments, converter 630 may determine a region having important changes corresponding to user inputs as a region of interest.

According to some embodiments of the present disclosure, converter 630 can provide prediction information of a certain picture (e.g., second picture 700_2) with respect to a reference picture (e.g., first picture 700_1) to video encoder 620. In some embodiments, converter 630 can provide prediction information to video encoder 620 via application programming interface (API) 621 provided to video encoder 620. In some embodiments, converter 630 can convert user inputs to prediction information in a format that video encoder 620 can understand and use in encoding pictures. In some embodiments, converter 630 can provide motion vectors as motion information of a certain picture with respect a reference picture to video encoder 620. In some embodiments, motion information from converter 630 can be provided to video encoder 620, e.g., to prediction stage 204 of FIG. 2A or temporal prediction stage 2044 of FIG. 2B and thus motion information can be represented as motion vectors that can be utilized in the corresponding stages (e.g., motion estimation). In some embodiments, converter 630 can provide region information to video encoder 620 such that video encoder 620 can perform a region of interest encoding. In some embodiments, converter 630 can be implemented by a processor (e.g., central processing unit (CPU)) and a conversion rule that converter 630 uses can be implemented as software program running on a processor.

According to some embodiments of the present disclosure, video encoder 620 can encode pictures (e.g., P-pictures) using prediction information received from converter 630 in a second operation mode. In some embodiments, as discussed earlier, video encoder 620 can be provided with API 621 that is a computing interface defining interactions between video encoder 620 and converter 630. In some embodiments, API 621 can be configured to define kind of calls or requests that can be made, how to make them, data formats that should be used, etc. In some embodiments, video encoder 620 can ask whether there is available prediction information in converter 630 or request available prediction information from 630 in a manner defined by API 621. In some embodiments, converter 630 can provide prediction information in formats defined by API 621. In some embodiments, API 621 can be custom designed or designed according to industry standard. In some embodiments, video encoder 620 can use motion information, e.g., at prediction stage 204 of FIG. 2A or at temporal prediction stage 2044 of FIG. 2B when estimating motion of a current picture with respect to a reference picture. For example, video encoder 620 can use first picture 700_1 of FIG. 7A as a reference picture (e.g., in prediction reference 224 of FIG. 2A and FIG. 2B) and utilize motion information from converter 630 as motion vectors for second picture 700_2 of FIG. 7B without estimating motion vectors corresponding to user inputs. In some embodiments, video encoder 620 may not estimate or predict at least part of motion vectors that represent motion changes of a current picture (e.g., P-picture) from a reference picture (e.g., I-picture). In some embodiments, video encoder 620 can still perform estimating or predicting motion vectors to supplement motion information from converter 330 or video encoder 620 can still perform estimating or predicting motion vectors that do not correspond to user inputs.

In some embodiments, video encoder 620 can use region information from converter 630 to perform region of interest encoding. In region of interest encoding, video encoder 620 may allocate encoding resources non-uniformly to a certain picture, which enables improving an encoding speed, bandwidth utilization, video quality, etc. For example, video encoder 620 can encode a region identified in the region information from converter 630 with higher resolution and encode other regions with coarser resolution, or video encoder 620 can only encode a region identified in the region information by completely masking out other regions. While motion information and region information are illustrated as prediction information generated based on user inputs, it will be appreciated that present disclosure can utilize user inputs in various ways when encoding pictures to improve video encoding latency, visual quality, or encoding throughput.

According to some embodiments of the present disclosure, encoded pictures can be transmitted to video displayer 651 of user device 650 over a network. In some embodiments, video displayer 651 can decode the received encoded pictures and display the decoded pictures on its screen. It is appreciated that in various embodiments video displayer 651 may perform at least part of stages in processes 300A or 300B of FIG. 3A and FIG. 3B. While some embodiments of the present disclosure are explained with respect to a certain video content, game, or user input, it will be appreciated that the present disclosure can be applied to any other video content, games, or user inputs. Further, while some embodiments of the present disclosure are explained with two consecutive pictures of video content, it will be appreciated that the present disclosure can be applied to any number (e.g., greater than two) of pictures of video content.

Figure 8:
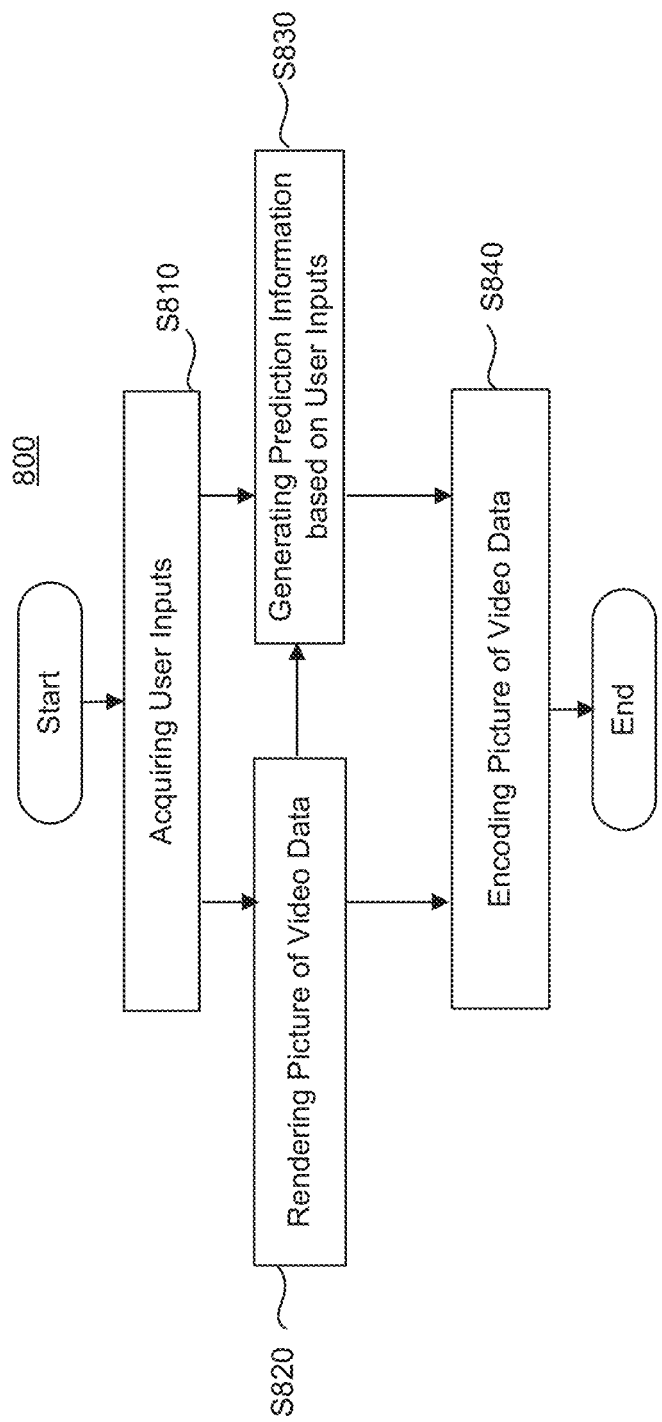
FIG. 8 illustrates an exemplary flow diagram for video encoding method for providing online video game service, consistent with some embodiments of the present disclosure.

Some embodiments of the present disclosure can provide a system and method to utilize user inputs to improve video encoding latency, visual quality, or encoding throughput. According to some embodiments of the present disclosure, video encoding speed or bandwidth utilization can be improved by performing region of interest encoding based on user guided information. According to some embodiments of the present disclosure, motion estimation complexity can be greatly reduced by using user guided information when encoding P-pictures. According to some embodiments of the present disclosure, an efficient video encoding scheme predicting motion vectors based on user guided information can be provided, which enables obtaining better tradeoff between video quality (e.g., resolution) and latency. Some embodiments of the present disclosure can provide better video quality compared to conventional technology under a condition of equal computation amount or latency. According to some embodiments of the present disclosure, improved encoding latency and motion vector computation can be achieved compared to conventional technology when achieving equal video quality. Some embodiments of the present disclosure can provide an efficient video encoding scheme that improves user experiences in playing online games. Some embodiments of the present disclosure can provide an efficient video encoding scheme enabling reducing encoding costs (e.g., time and resources) by using user inputs when estimating motion vectors FIG. 8 illustrates an exemplary flow diagram for a video encoding method for providing online video game service, consistent with some embodiments of the present disclosure. For illustrative purposes, video encoding method 800 for providing online video game service will be described referring to video encoding apparatus of FIG. 6. According to some embodiments of the present disclosure, video encoding method 800 can be performed in two modes: a first operation mode where user guided prediction information from step S830 is not utilized for video encoding in step S840; and a second operation mode where user guided prediction information from step S830 is utilized for video encoding in step S840. In some embodiments, the second operation mode can be triggered when user inputs are received or P-pictures are encoded. In some embodiments, the first operation mode and the second operation mode can be selected by a default setting, a user setting, or implementation requirements, etc.

In step S810, user inputs can be acquired. In some embodiments, user inputs can be received from user device 650 via, e.g., a network interface (e.g., network interface 406 in FIG. 4A). In some embodiments, user device 650 can comprise or communicate with user input provider 652 that includes, but is not limited to, a cursor control device (e.g., a mouse, a touchpad, or a touchscreen), a touch control device (e.g., touchscreen, touchpad, etc.), a keyboard, a video input device (e.g., a camera or an input interface coupled to a video archive), a microphone, joystick, a game controller, a game dedicated controller, or the like. In some embodiments, user 653 can control a video game displayed on video displayer 651 by providing control actions, user inputs, or feedbacks via user device 650. In the present disclosure, control actions, user inputs, and feedbacks are collectively referred to as user inputs.

In step S820, a picture of video data can be rendered. Step S820 can be performed by, for example, renderer 610, among others. In some embodiments, a picture can be rendered based on a scene file containing geometry, viewpoint, texture, lighting, and shading information describing a certain scene. For example, first picture 700_1 of FIG. 7A can be rendered based on a scene file corresponding to first picture 700_1. While FIG. 8 is illustrated to include step S810 before step S820, it will be appreciated that in some various embodiments, step S810 can be omitted and step S820 can be performed without receiving user inputs.

In some embodiments, a picture can be rendered based on user inputs. In some embodiments, video content can be responsive to user inputs. When playing a video game, a scene at a certain time can be different depending user inputs. For example, a user input corresponding to ball kicking is received after first picture 700_1 and thereby second picture 700_2 can be determined based on the user input. In some embodiments, pictures can be rendered based on user inputs and calculation of physics related to user inputs. In some embodiments, in order to determine a scene at a certain time, how a target object corresponding to a user input moves between a previous picture and a subsequent picture can be determined. In some embodiments, a distance and a direction of motion of a target object can be determined. Based on determination of motion of a target object between two consecutive pictures, where to put a target object in a subsequent picture can be determined. In some embodiments, default values that have been set by a game provider can be used as a motion speed and a direction corresponding to a certain user input. In some embodiments, a position of a target object can be determined based on the determined speed and direction of the target object.

According to some embodiments, upon receiving user inputs in step S810, a second operation mode can be initiated and the method 800 may proceed to step S830. In step S830, prediction information can be generated based on user inputs. Step S830 can be performed by, for example, converter 630, among others. In some embodiments, motion information can be estimated based on user inputs acquired in step S810. In some embodiments, prediction information can comprise motion information, region information, etc. In some embodiments, motion information can comprise distance and direction information of motion of a target object between a reference picture and a current picture. In some embodiments, motion information can be represented as motion vectors that represent position changes of a group of pixels that represent a target object.

According to some embodiments of the present disclosure, a meaning of user inputs can be determined based on video information. In some embodiments, user inputs may have different meanings depending on video contents. In some embodiments, video information can contain information of a launched game, a game type, a user profile, etc. In some embodiments, a game type can include whether the game is a single player game (e.g., first-person shooter (FPS) game) or a multiplayer game (e.g., multiplayer online battle arena (MOBA) game). In some embodiments, a user profile can include information about which object or player is associated with a corresponding user.

In some embodiments, a meaning of user inputs can be determined based on association of user inputs with predetermined control actions in corresponding video content. For example, a press of a button on a keyboard (e.g., user input provider 652) can mean a ball kicking action in a soccer game while the same user input can mean a gun shooting action in a shooter game. In some embodiments, a single control action can have different effects on a picture according to a game type and a user profile. In some embodiments, based on game type information and user profile information, which object or player is controlled by a user can be determined. For example, when a launched game is a single player game, it can be determined that a user input is directed to a single player on the game or an object associated with the single player. Similarly, when a launched game is a multiplayer game, which player or object is controlled by a user can be determined based on game type information and user profile information.

In some embodiments, in step S830, motion distance and direction information generated in step S820 can be used. In some embodiments, how far and in which direction a target object has moved in a current picture with respect to a reference picture can be determined based on the received motion distance and direction information. In the above example, how far ball 730 has moved from first picture 700_1 and in which direction ball 730 has moved from first picture 700_1 can be determined based on motion distance and direction information. In some embodiments of the present disclosure, in step S830, motion vectors between two consecutive pictures can be estimated based on user inputs, video information, or motion distance and direction information. According to some embodiments of the present disclosure, user inputs can be converted into motion information that can be provided to step S840 via application programming interface (API).

According to some embodiments of the present disclosure, prediction information may comprise region information that is predicted to comprise changes of a certain picture with respect to a reference picture. In some embodiments, region information can define a region of interest (ROI) for encoding based on user inputs. In some embodiments, a region including a target object of a user input can be determined to comprise more important changes of a current picture with respect to a reference picture compared to other regions. For example, a region including ball 730 (e.g., as a target object) associated with first player 710 can be determined to comprise more important changes than a region associated with second player 720. In some embodiments, a region on which a cursor is placed can be determined to comprise important changes. In some embodiments, region information can be generated based on a meaning of user inputs that are determined referring to a game type or a user profile. For example, when a game is a soccer game, it can be determined that changes in a stand area may be less important and changes in a player ground is important. According to some embodiments, a region having important changes corresponding to user inputs can be determined as a region of interest.

In step S840, pictures rendered in step S820 can be encoded. Step S840 can be performed by, for example, video encoder 620, among others. As discussed above, according to some embodiments of the present disclosure, Step S840 can be performed in two modes: a first operation mode where user guided prediction information from step S830 is not utilized for video encoding in step S840; and a second operation mode where user guided prediction information from step S830 is utilized for video encoding in step S840. According to some embodiments of the present disclosure, I-picture can be encoded based on the rendered picture without predicting or estimating changes referring to other pictures. For example, first picture 700_1 of FIG. 7A can be encoded as I-picture. In some embodiments, encoding I-pictures can be performed in the first operation mode. According to some embodiments of the present disclosure, P-picture can be encoded based on the rendered video picture including changes with respect to a reference picture. For example, second picture 700_2 of FIG. 7B can be encoded as P-picture using first picture 700_1 as a reference picture. In some embodiments, P-picture corresponding to second picture 700_2 can include changes such as position changes, luminosity changes, color changes of pixels, and so on with respect to I-picture. In some embodiments, prediction information generated in step S830 can be used to encode P-pictures. In some embodiments, encoding P-pictures can be performed in either of the first operation mode or the second operation mode. For example, encoding P-pictures can be performed in the second operation mode when there are user inputs, and encoding P-pictures can be performed in the first operation mode when there are no user inputs.

According to some embodiments of the present disclosure, in step S840, pictures (e.g., P-pictures) can be encoded using prediction information from step S830 in a second operation mode. In some embodiments, in step S840, motion information can be used, e.g., at prediction stage 204 of FIG. 2A or at temporal prediction stage 2044 of FIG. 2B when estimating motion of a current picture with respect to a reference picture. For example, motion information can be used as motion vectors without estimating motion vectors corresponding to user inputs. In some embodiments, calculating or estimating motion vectors can be omitted or reduced by using motion information generated in step S830 when encoding P-pictures. In some embodiments, estimating or predicting motion vectors can still be performed to supplement motion information from step S830. In some embodiments, estimating or predicting motion vectors that do not correspond to user inputs can still be performed.)

In some embodiments, in step S840, region of interest (ROI) encoding can be performed based on region information generated in step S830. In region of interest encoding, encoding resources can be non-uniformly allocated to a certain picture, which enables improving an encoding speed, bandwidth utilization, video quality, etc. For example, a region identified in the region information can be encoded with higher resolution and other regions can be encoded with coarser resolution. In some embodiments, only a region identified in the region information can be encoded by completely masking out other regions. While motion information and region information are illustrated as prediction information generated based on user inputs, it will be appreciated that present disclosure can utilize user inputs in various ways when encoding pictures to improve video encoding latency, visual quality, or encoding throughput.

According to some embodiments of the present disclosure, encoded pictures can be transmitted to a user device over a network. In some embodiments, a video displayer of a user device can decode the received encoded pictures and display the decoded pictures on its screen.

The embodiments may further be described using the following clauses:

1. A computer-implemented method for processing video data, the method comprising:
receiving a user input corresponding to a first picture of the video data;
generating, based on the user input, prediction information of the first picture with respect a reference picture of the video data; and
encoding the first picture using the prediction information.

2. The method of clause 1, wherein encoding the first picture using the prediction information comprises encoding the first picture using the prediction information to generate a predicted picture (P-picture) based on the prediction information with respect to the reference picture.

3. The method of clause 1 or 2, wherein generating, based on the user input, the prediction information comprises:
determining a type of motion corresponding to the user input based on association of the user input with a predetermined control action in the video data; and
determining a target object of the motion corresponding to the user input in the first picture based on a user profile information to the video data.

4. The method of clause 3, wherein generating, based on the user input, the prediction information further comprises:
determining a distance and direction of the motion of the target object between the reference picture and the first picture.

5. The method of clause 4, wherein determining the distance and the direction of the motion of the target object comprises determining the distance and the direction of the motion based on the user input.

6. The method of any one of clauses 1-5, wherein generating, based on the user input, the prediction information of the first picture comprises generating, based on the user input, a prediction information application program interface.

7. The method of any one of clauses 1-6, wherein encoding the first picture using the prediction information comprises encoding the first picture using the prediction information, the first picture, and the reference picture.

8. The method of any one of clauses 1-7, wherein the prediction information comprises region information that defines a region of interest for encoding.

9. The method of clause 8, wherein generating, based on the user input, the prediction information comprises:
determining a type of motion corresponding to the user input based on association of the user input with a predetermined control action in the video data;
determining a target object of the motion corresponding to the user input in the first picture based on a user profile information to the video data; and
determining a region including the target object as the region of interest for encoding.

10. An apparatus for processing video data, comprising:
a memory for storing a set of instructions; and
at least one processor configured to execute the set of instructions to cause the apparatus to perform:
receiving a user input corresponding to a first picture of the video data;
generating, based on the user input, prediction information of the first picture with respect a reference picture of the video data; and
encoding the first picture using the prediction information.

11. The apparatus of clause 10, wherein in encoding the first picture using the prediction information, the at least one processor is configured to execute the set of instructions to cause the apparatus to further perform: encoding the first picture using the prediction information to generate a predicted picture (P-picture) based on the prediction information with respect to the reference picture.

12. The apparatus of clause 10 or 11, wherein in generating, based on the user input, the prediction information, the at least one processor is configured to execute the set of instructions to cause the apparatus to further perform:
determining a type of motion corresponding to the user input based on association of the user input with a predetermined control action in the video data; and
determining a target object of the motion corresponding to the user input in the first picture based on a user profile information to the video data.

13. The apparatus of clause 12, wherein in generating, based on the user input, the prediction information, the at least one processor is configured to execute the set of instructions to cause the apparatus to further perform:

determining a distance and direction of the motion of the target object between the reference picture and the first picture.

14. The apparatus of clause 13, wherein in determining the distance and the direction of the motion of the target object, the at least one processor is configured to execute the set of instructions to cause the apparatus to further perform:
determining the distance and the direction of the motion based on the user input.

15. The apparatus of any one of clauses 10-14, wherein in wherein generating, based on the user input, the prediction information of the first picture, the at least one processor is configured to execute the set of instructions to cause the apparatus to further perform:
generating, based on the user input, a prediction information application program interface.

16. The apparatus of any one of clauses 10-15, wherein in encoding the first picture using the prediction information, the at least one processor is configured to execute the set of instructions to cause the apparatus to further perform:
encoding the first picture using the prediction information, the first picture, and the reference picture.

17. A non-transitory computer readable medium that stores a set of instructions that is executable by at least one processor of a computing device to perform a method for processing video data, the method comprising:
receiving a user input corresponding to a first picture of the video data;
generating, based on the user input, prediction information of the first picture with respect a reference picture of the video data; and
encoding the first picture using the prediction information.

18. The computer readable medium of clause 17, wherein in encoding the first picture using the prediction information, the set of instructions that are executable by at least one processor of the computing device to cause the computing device to further perform:
encoding the first picture using the prediction information to generate a predicted picture (P-picture) based on the prediction information with respect to the reference picture.

19. The computer readable medium of clause 17 or 18, wherein in generating, based on the user input, the prediction information, the set of instructions that are executable by at least one processor of the computing device to cause the computing device to further perform:
determining a type of motion corresponding to the user input based on association of the user input with a predetermined control action in the video data; and
determining a target object of the motion corresponding to the user input in the first picture based on a user profile information to the video data.

20. The computer readable medium of clause 19, wherein in generating, based on the user input, the prediction information, the set of instructions that are executable by at least one processor of the computing device to cause the computing device to further perform:
determining a distance and direction of the motion of the target object between the reference picture and the first picture.

21. The computer readable medium of clause 20, wherein in determining the distance and the direction of the motion of the target object, the set of instructions that are executable by at least one processor of the computing device to cause the computing device to further perform:
determining the distance and the direction of the motion based on the user input.

22. The computer readable medium of any one of clauses 17 to 21, wherein in generating, based on the user input, the prediction information of the first picture, the set of instructions that are executable by at least one processor of the computing device to cause the computing device to further perform:
generating, based on the user input, a prediction information application program interface.

23. The computer readable medium of any one of clauses 17 to 22, wherein in encoding the first picture using the prediction information, the set of instructions that are executable by at least one processor of the computing device to cause the computing device to further perform:
encoding the first picture using the prediction information, the first picture, and the reference picture.

24. A system comprising:
a user device including a displayer and a user input provider; and
an apparatus for processing video data, comprising:
a memory for storing a set of instructions; and
at least one processor configured to execute the set of instructions to cause the apparatus to perform:
receiving, from the user device, a user input corresponding to a first picture of the video data;
generating, based on the user input, prediction information of the first picture with respect a reference picture of the video data; and
encoding the first picture using the prediction information.

Embodiments herein include database systems, methods, and tangible non-transitory computer-readable media. The methods may be executed, for example, by at least one processor that receives instructions from a tangible non-transitory computer-readable storage medium. Similarly, systems consistent with the present disclosure may include at least one processor and memory, and the memory may be a tangible non-transitory computer-readable storage medium. As used herein, a tangible non-transitory computer-readable storage medium refers to any type of physical memory on which information or data readable by at least one processor may be stored. Examples include random access memory (RAM), read-only memory (ROM), volatile memory, non-volatile memory, hard drives, CD ROMs, DVDs, flash drives, disks, registers, caches, and any other known physical storage medium. Singular terms, such as "memory" and "computer-readable storage medium," may additionally refer to multiple structures, such a plurality of memories or computer-readable storage media. As referred to herein, a "memory" may comprise any type of computer-readable storage medium unless otherwise specified. A computer-readable storage medium may store instructions for execution by at least one processor, including instructions for causing the processor to perform steps or stages consistent with embodiments herein. Additionally, one or more computer-readable storage media may be utilized in implementing a computer-implemented method. The term "non-transitory computer-readable storage medium" should be understood to include tangible items and exclude carrier waves and transient signals.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A computer-implemented method for processing video data, the method comprising:
   receiving a user input corresponding to a first picture of the video data, the user input being associated with one or more changes of a target object in the first picture with respect to a reference picture of the video data, the one or more changes representing differences of the target object between the first picture and the reference picture;
   estimating, by utilizing the user input associated with the one or more changes, prediction information corresponding to the one or more changes of the target object in the first picture with respect to the reference picture of the video data; and
   encoding the first picture using the prediction information.

2. The method of claim 1, wherein encoding the first picture using the prediction information comprises encoding the first picture using the prediction information to generate a predicted picture (P-picture) based on the prediction information with respect to the reference picture.

3. The method of claim 1, wherein estimating, by utilizing the user input associated with the one or more changes, the prediction information comprises:
   determining a type of motion corresponding to the user input based on association of the user input with a predetermined control action in the video data; and
   determining the target object of the motion corresponding to the user input in the first picture based on a user profile information to the video data.

4. The method of claim 3, wherein estimating, by utilizing the user input associated with the one or more changes, the prediction information further comprises:
   determining a distance and direction of the motion of the target object between the reference picture and the first picture.

5. The method of claim 1, wherein estimating, by utilizing the user input associated with the one or more changes, prediction information corresponding to the one or more changes of the first picture comprises receiving the prediction information via application program interface.

6. The method of claim 1, wherein encoding the first picture using the prediction information comprises encoding the first picture using the prediction information, the first picture, and the reference picture.

7. The method of claim 1, wherein the prediction information comprises region information that defines a region of interest for encoding.

8. The method of claim 7, wherein estimating, by utilizing the user input associated with the one or more changes, the prediction information comprises:
   determining a type of motion corresponding to the user input based on association of the user input with a predetermined control action in the video data;
   determining the target object of the motion corresponding to the user input in the first picture based on a user profile information to the video data; and
   determining a region including the target object as the region of interest for encoding.

9. An apparatus for processing video data, comprising:
a memory for storing a set of instructions; and
at least one processor configured to execute the set of instructions to cause the apparatus to perform:
   receiving a user input corresponding to a first picture of the video data, the user input being associated with one or more changes of a target object in the first picture with respect to a reference picture of the video data, the one or more changes representing differences of the target object between the first picture and the reference picture;
   estimating, by utilizing the user input associated with the one or more changes, prediction information corresponding to the one or more changes of the target object in the first picture with respect to the reference picture of the video data; and
   encoding the first picture using the prediction information.

10. The apparatus of claim 9, wherein in encoding the first picture using the prediction information, the at least one processor is configured to execute the set of instructions to cause the apparatus to further perform: encoding the first picture using the prediction information to generate a predicted picture (P-picture) based on the prediction information with respect to the reference picture.

11. The apparatus of claim 9, wherein in estimating, by utilizing the user input associated with the one or more changes, the prediction information, the at least one processor is configured to execute the set of instructions to cause the apparatus to further perform:
   determining a type of motion corresponding to the user input based on association of the user input with a predetermined control action in the video data; and
   determining the target object of the motion corresponding to the user input in the first picture based on a user profile information to the video data.

12. The apparatus of claim 11, wherein in estimating, by utilizing the user input associated with the one or more changes, the prediction information, the at least one processor is configured to execute the set of instructions to cause the apparatus to further perform:
   determining a distance and direction of the motion of the target object between the reference picture and the first picture.

13. The apparatus of claim 12, wherein in determining the distance and the direction of the motion of the target object, the at least one processor is configured to execute the set of instructions to cause the apparatus to further perform:
   determining the distance and the direction of the motion based on the user input.

14. The apparatus of claim 9, wherein in estimating, by utilizing the user input associated with the one or more changes, prediction information corresponding to the one or more changes of the first picture, the at least one processor is configured to execute the set of instructions to cause the apparatus to further perform:

receiving the prediction information via application program interface.

15. The apparatus of claim 9, wherein in encoding the first picture using the prediction information, the at least one processor is configured to execute the set of instructions to cause the apparatus to further perform:
encoding the first picture using the prediction information, the first picture, and the reference picture.

16. A non-transitory computer readable medium that stores a set of instructions that is executable by at least one processor of a computing device to perform a method for processing video data, the method comprising:
receiving a user input corresponding to a first picture of the video data, the user input being associated with one or more changes of a target object in the first picture with respect to a reference picture of the video data, the one or more changes representing differences of the target object between the first picture and the reference picture;
estimating, by utilizing the user input associated with the one or more changes, prediction information corresponding to the one or more changes of the target object in the first picture with respect to the reference picture of the video data; and
encoding the first picture using the prediction information.

17. The computer readable medium of claim 16, wherein in encoding the first picture using the prediction information, the set of instructions that are executable by at least one processor of the computing device to cause the computing device to further perform:
encoding the first picture using the prediction information to generate a predicted picture (P-picture) based on the prediction information with respect to the reference picture.

18. The computer readable medium of claim 16, wherein in estimating, by utilizing the user input associated with the one or more changes, the prediction information, the set of instructions that are executable by at least one processor of the computing device to cause the computing device to further perform:
determining a type of motion corresponding to the user input based on association of the user input with a predetermined control action in the video data; and
determining the target object of the motion corresponding to the user input in the first picture based on a user profile information to the video data.

19. The computer readable medium of claim 16, wherein in encoding the first picture using the prediction information, the set of instructions that are executable by at least one processor of the computing device to cause the computing device to further perform:
encoding the first picture using the prediction information, the first picture, and the reference picture.

20. A system comprising:
a user device including a displayer and a user input provider; and
an apparatus for processing video data, comprising:
a memory for storing a set of instructions; and
at least one processor configured to execute the set of instructions to cause the apparatus to perform:
receiving, from the user device, a user input corresponding to a first picture of the video data, the user input being associated with one or more changes of a target object in the first picture with respect to a reference picture of the video data, the one or more changes representing differences of the target object between the first picture and the reference picture;
estimating, by utilizing the user input associated with the one or more changes, prediction information corresponding to the one or more changes of the target object in the first picture with respect to the reference picture of the video data; and
encoding the first picture using the prediction information.

* * * * *